Oct. 12, 1948.    H. L. NANCARROW ET AL    2,451,042
METHOD OF AND DEVICE FOR RE-TRACKING RAIL VEHICLES
Filed Nov. 29, 1945    3 Sheets-Sheet 1
FIG_1_
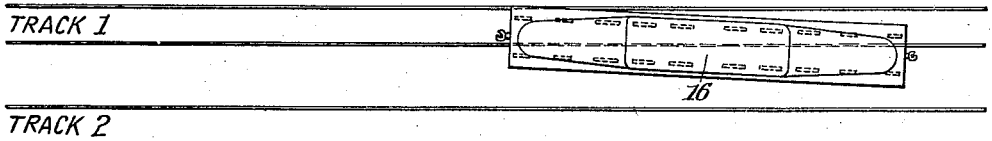
FIG_6_
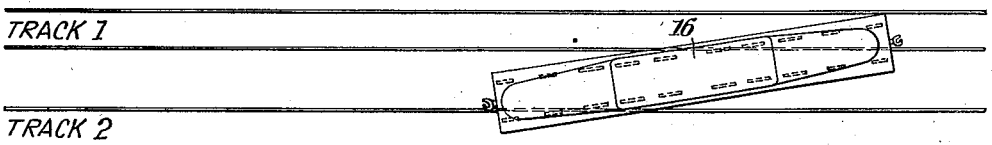
FIG_3_
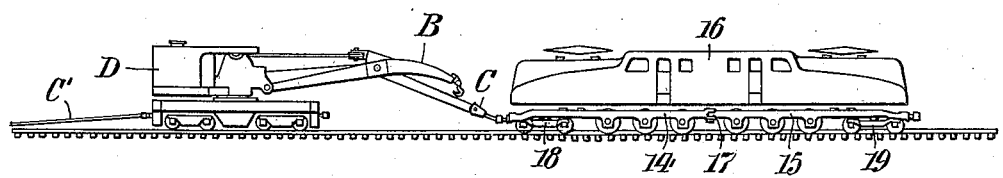
FIG_2_
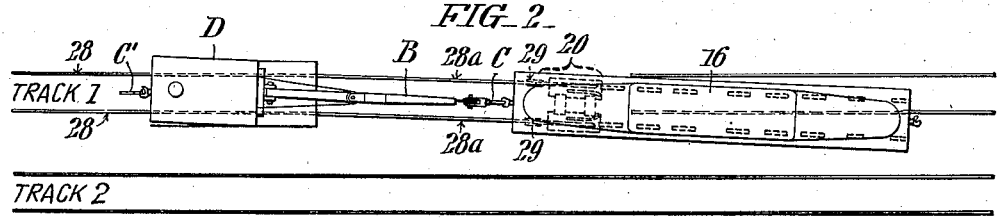
FIG_7_
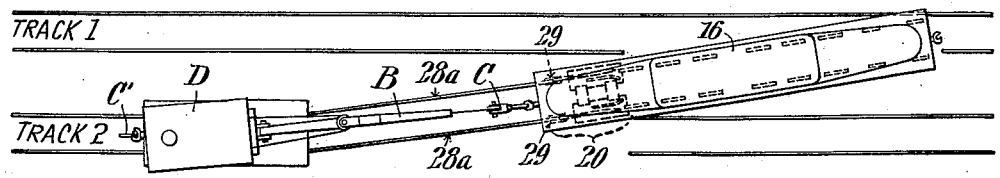
WITNESSES
INVENTORS:
Harry L. Nancarrow &
Allen R. Wilson,
BY
Paul & Paul
ATTORNEYS.

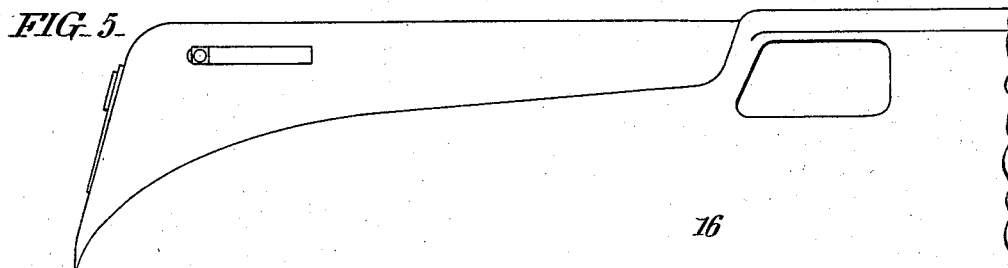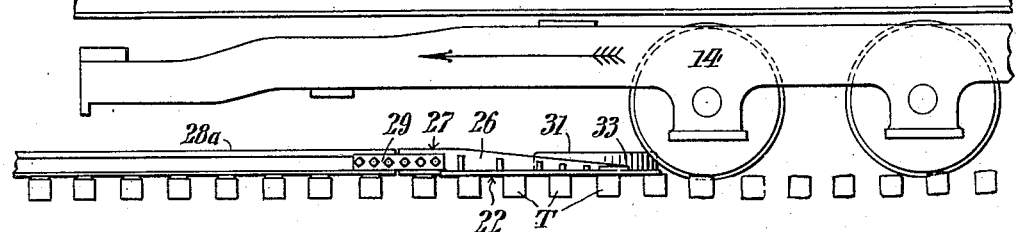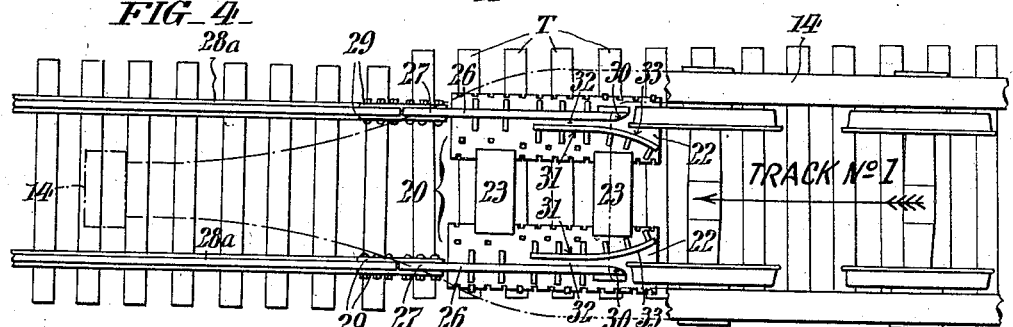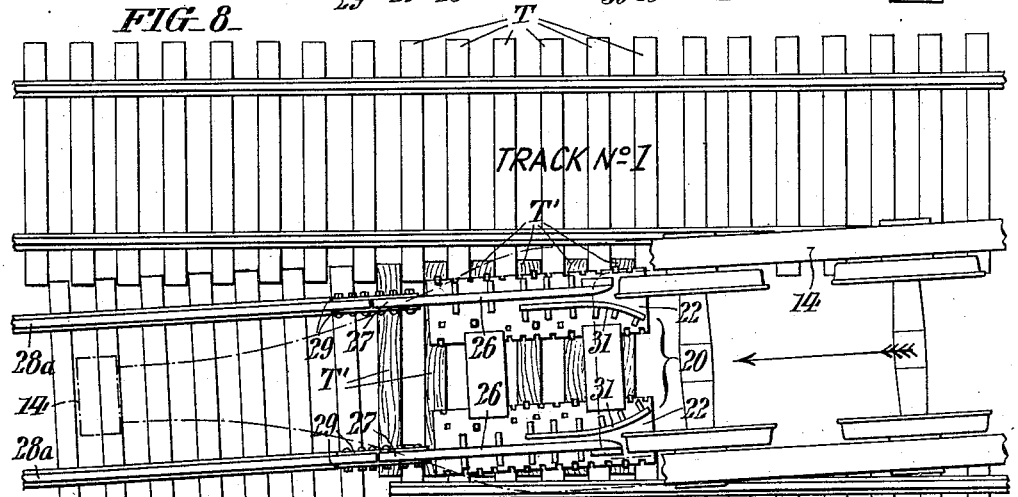

Oct. 12, 1948.  H. L. NANCARROW ET AL  2,451,042
METHOD OF AND DEVICE FOR RE-TRACKING RAIL VEHICLES
Filed Nov. 29, 1945  3 Sheets-Sheet 3
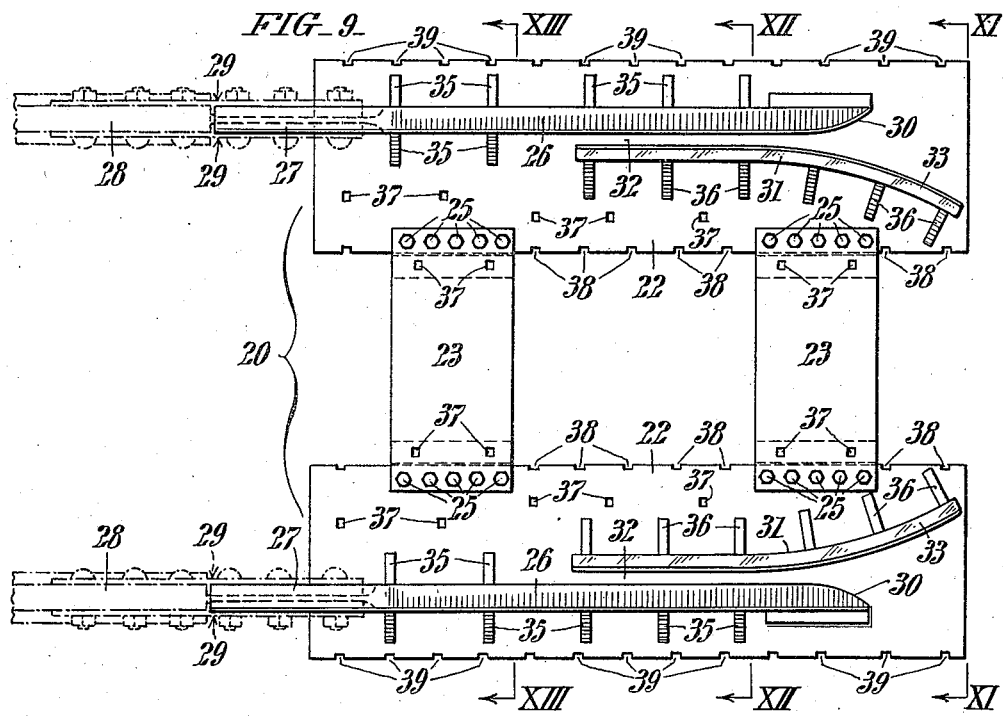
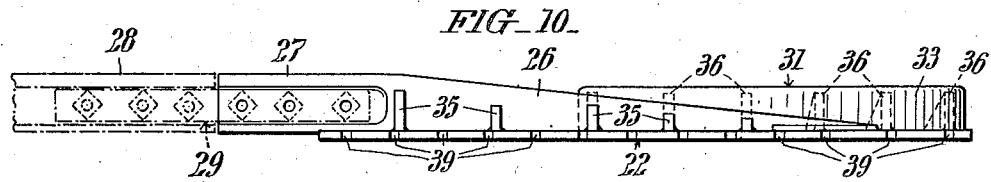
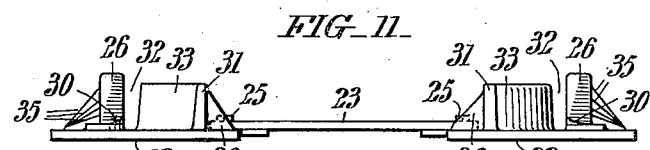
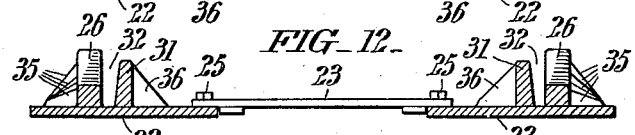
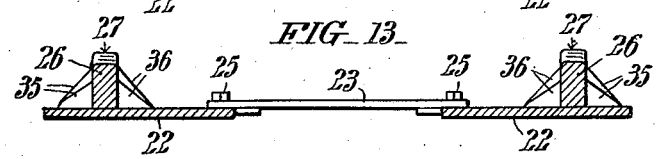
WITNESSES
INVENTORS:
Harry L. Nancarrow &
Allen R. Wilson,
BY
Paul & Paul
ATTORNEYS.

Patented Oct. 12, 1948

2,451,042

UNITED STATES PATENT OFFICE 2,451,042

METHOD OF AND DEVICE FOR RETRACKING RAIL VEHICLES

Harry L. Nancarrow, Philadelphia, and Allen R. Wilson, Lansdowne, Pa., assignors to The Pennsylvania Railroad Company, Philadelphia, Pa., a corporation of Pennsylvania Application November 29, 1945, Serial No. 631,602

5 Claims. (Cl. 104—262)

1

This invention relates to methods of and devices for re-tracking derailed rail vehicles, particularly electric locomotives of a type having two articulately-connected swivelled driver trucks with plural pairs of driving wheels, and small wheel swivelled end trucks. Due to the great length and weight of such locomotives, it has been found difficult to replace them after derailment by the methods and means heretofore ordinarily used in re-tracking operations.

The chief aim of our invention is to provide a simple method of re-tracking rolling stock of the kind referred to, and also an improved device with the aid of which such operations can be effectively carried out in a minimum of time and at relatively small expense.

How the foregoing and other advantages may be readily realized in practice will appear from the following description of the attached drawings, wherein Fig. 1 is a diagrammatic view in top plan of a multiple track railway with a locomotive derailed from one of the tracks.

Fig. 2 is a similar view showing our improved re-railing device in place and the apparatus employed in replacing the locomotive on the track from which it was derailed.

Fig. 3 shows the organization in side elevation.

Figs. 4 and 5 are fragmentary views corresponding to Figs. 2 and 3 and drawn to a larger scale.

Fig. 6 is a view like Fig. 1 showing another condition of derailment.

Fig. 7 is a view corresponding to Fig. 2 showing how the derailed locomotive in Fig. 6 is replaced.

Fig. 8 is a fragmentary view corresponding to Fig. 7 and drawn to a larger scale.

Fig. 9 shows the top plan view of our improved re-tracking means on a still larger scale.

Fig. 10 shows the device in side elevation looking toward the bottom of Fig. 9.

Fig. 11 shows the device in end elevation, viewed as indicated by the angled arrows XI—XI in Fig. 9.

Figs. 12 and 13 are sectional views taken as respectively indicated by the angled arrows XII—XII and XIII—XIII in Fig. 9.

The electric locomotive herein illustrated by way of example is of a type having two main trucks 14 and 15 (Fig. 3) of which the frames are independently swivelled to the locomotive body 16 with their contiguous ends articulately connected at 17 each of said trucks comprising plural pairs of driving wheels. The locomotive moreover has two smaller wheeled end or guide

2 trucks 18 and 19 which are in turn swivelled to the frames of the main trucks 14 and 15.

The means which we have devised to aid in replacement of such a locomotive is comprehensively designated by the numeral 20, and, as best shown in Figs. 9–13, includes a base structure fashioned from stiff heavy gauge plate metal with transversely-spaced longitudinal components 22, and with crosswise components 23 connecting said longitudinal components adjacent their opposite ends. Although illustrated as being secured to the longitudinal base components 22 by screw bolts 25, the crosswise connecting components 23 may, if found more desirable, be permanently attached as by riveting or welding. As a further alternative, the base structure may be in the form of a single sheet. Welded respectively to the longitudinal components 22 of the base structure are relatively long ramp rail segments 26 whereof the high ends 27 (Fig. 10) have a cross section which corresponds to that of standard track rails 28 so that splicing bars 29 may be employed to connect them to the track rails. The ramps 26 slope upwardly from the top surface of the base structure of the device 20 (i. e. from the track bed level) into flush relation with the tops of the track rails 28, and are rounded as at 30 at the inner sides of their approach ends. Also welded to the longitudinal components 22 of the base structure are guard rail segments 31 which are disposed inwardly of the approach ends of the ramps 26. The rear end portions of the guard segments 31 extend in parallel relation to the ramps 26 with provision of wheel flange receiving intervals at 32, while the front end portions of said segments extend somewhat beyond the approach ends of the ramps and are curved away from the ramps as at 33 to form flared entrances for said flange receiving intervals. In the rerailment, the curved portions 33 of the guard segments react upon the wheel flanges and so guide the wheels of the locomotive onto the ramps 26 as will be more fully explained presently. As shown, the ramps 26 and the guards 31 are braced respectively by butress pieces 35 and 36 welded to them and to the base components 22. At suitable longitudinal intervals longitudinally of the device 20, the base components 22 and 23 are provided with rectangular holes 37 to enable the use of spikes in securing the device to supporting ties as later on explained. For a similar purpose the longitudinal inner and outer edges of the base components 22 are notched at intervals as at 38 and 39.

To restore the locomotive to track No. 1 of

Fig. 1 from which it was derailed and left in the position illustrated, the procedure in accordance with our invention is as follows: The frames of the two main trucks 14 and 15 are first clamped together at the joint 17 to keep the driving wheels aligned during subsequent re-railing, and a derrick car D brought up from the left on track No. 1, as shown in Figs. 2 and 3. The boom B of the car D is thereupon operated to lift the front end of the locomotive sufficiently to permit removal of the guide truck 18. The rails of track 1 are disconnected or parted in a crosswise line approximately even with the first (left) pair of drive wheels of the locomotive in Fig. 2. Two ends of the parted rails are then swung sidewise to bodily displace a portion 28a of the track 1 angularly (without further breaking or disjoining the rails) as in Fig. 2 into line with the locomotive. The length of track necessary to be so displaced will depend upon the position of the derailed locomotive and will be governed by the resistivity of the rails to flexure. In any case, it will at least be equal in length to that of the locomotive and lie between the derrick D in Fig 2 and the first (left) pair of drive wheels of the locomotive. With this accomplished, the device 20 is positioned on the track ties T as in Fig. 4 in the interval between the displaced rail sections 28a and said driving wheels, so that the ramps 26 align in turn with said rail sections 28a. With the device 20 so positioned, the free ends of the displaced rail lengths 28a and the high ends of the ramps 26 are connected by application of the splicing bars 29, and the device thereupon secured to the ties T by means of spikes driven through the holes 37 and/or the notches 38, 39 in the base structure 21. The tackle cable C of the car D is next coupled to the front end of the truck frame 14 of the locomotive as in Fig. 3, after anchoring of said car by means of another cable C' to the track No. 1. Through subsequent pull upon the derailed locomotive as the cable C is taken up, the wheels are rolled up the ramp 26 onto the displaced rail lengths 28a and the locomotive thereby eventually restored to track No. 1 in a manner which will be readily understood from Fig. 2. Due to being curved at 33, the guards 31 of the device 20 will, if required, laterally direct the wheels of the derailed locomotive to insure entry of the wheel flanges into the flange-receiving intervals 32. With the locomotive now fully restored to the track, the clamp at 17 is released and the guide truck 18 finally replaced.

A derailed locomotive in the position shown in Fig. 6 may be replaced in the same general way with a derrick car D brought up from the left on track No. 2 as shown in Fig. 7, except that in this case a portion of one of the rails of track No. 1 is removed in addition to angularly displacing a portion of the track No. 2, and further in that auxiliary ties must be used to support the re-railing device 20 on the road bed between the two tracks. Such auxiliary ties are indicated at T' in Fig. 8 from which it will be noted that they are laid with their opposite ends engaged in the intervals between adjacent pairs of the regular ties T of the two tracks.

A locomotive derailed as in Fig. 6 may be replaced on track No. 1 by bringing up the derrick car D from the right on said track and proceeding as before except that here a portion of one rail of track No. 2 would have to be removed in addition to angularly displacing a portion of track No. 1.

Again by the same procedure the derailed locomotive in Fig. 1 may, by bringing the derrick car D up from the right on track No. 2, be replaced on said track.

To those skilled in the railroading art it will be evident without further illustration or description, that replacement of locomotives derailed at curves can be accomplished as readily as locomotives derailed at tangent track, by resorting to the improved method and employing the means hereinbefore disclosed. While for the purpose of exemplification we have illustrated and described our invention as being particularly adapted for replacing de-railed locomotives of a particular type, it is to be understood that the same may be utilized without sacrifice of any of the advantages pointed out, in replacing other types of derailed locomotives as well as of derailed passenger and freight cars.

Having thus described our invention, we claim:

1. The method of re-tracking a derailed locomotive or the like which comprises parting the rails of an adjacent track in a transverse line approximately even with a pair of end wheels of the locomotive; shifting two rail ends of the parted track side-wise by bending them without any further disconnection of any rail joints, to displace a portion of the track equal substantially in length to that of the locomotive, into alignment with the latter; inserting between the free ends of the displaced rail sections and said end wheels, ramps with slopes extending from the track bed level to the tops of said displaced rail sections; and thereupon moving the locomotive to roll its wheels up the ramps for ultimate diversion onto the track proper by way of the displaced portions of the rails.

2. A method of re-tracking a derailed locomotive having a guide truck in advance of plural pairs of drivers, which method comprises removing the guide truck; parting the rails of an adjacent track in a transverse line approximately even with the first pair of drivers of the locomotive; shifting two rail ends of a parted track side-wise by bending them without further disconnection of any rail joints, to displace a portion of the track equal substantially in length to that of the locomotive, into alignment with the latter; inserting between the free ends of the displaced rail lengths and said first pair of drivers, ramps with slopes extending from the track bed level to the tops of said displaced rail sections; moving the locomotive to roll its drivers up the ramps for diversion of the track proper by way of the displaced portions of the rails; and finally replacing the previously removed guide truck.

3. A method of re-tracking a derailed locomotive having a small guide wheel truck and two serially-arranged plural wheel swivelled driver trucks with frames articulately connected at their contiguous ends by a coupling means, said method comprising removing said guide truck and securing the driver truck frames against relative movement at the coupling connection; parting the rails of an adjacent track in a transverse line approximately even with the end pair of drivers of the locomotive; shifting two rail ends of the parted track side-wise by bending them without further disconnection of any rail joints, to displace a portion of the track equal substantially in length to that of the locomotive, into alignment with the latter; inserting between the free ends of the displaced rails and said end drivers, ramps with slopes extending from the track bed levels to the tops of said rail sections;

then moving the locomotive to roll its several drivers up the ramps for diversion onto the track proper by way of the displaced portions of the rails; freeing the coupling connection between the driver truck frames; and finally replacing the guide truck of the locomotive.

4. A device useful in re-tracking a derailed locomotive or the like comprising a flat base structure with spaced longitudinally-extending plates and with transverse plates connecting the longitudinal plates adjacent opposite ends; ramp segments in track gauge relation integral with said longitudinal plates; and means for detachably connecting the ramps at their high ends to the ends of displaced portions of a track rail to which the locomotive is to be transferred.

5. A re-tracking device according to claim 4, further including guard rail segments on the longitudinal plates in parallel relation to the respective ramps at the inner sides to provide wheel flange receiving intervals, the front ends of said guard rail segments extending somewhat beyond the approach ends of the ramps and being curved away from the latter to form flared entrances to said wheel flange intervals.

HARRY L. NANCARROW.
ALLEN R. WILSON.

REFERENCES CITED

The following references are of record in the file of this patent:

UNITED STATES PATENTS

| Number | Name | Date |
|---|---|---|
| 1,243,920 | Coalson | Oct. 23, 1917 |
| 1,368,506 | Kezon | Feb. 15, 1921 |
| 1,418,588 | Lyberger | June 6, 1922 |
| 1,811,332 | Pressnall | June 23, 1931 |

FOREIGN PATENTS

| Number | Country | Date |
|---|---|---|
| 16,199 | Great Britain | Aug. 29, 1895 |